United States Patent
Sato et al.

(10) Patent No.: US 8,673,168 B2
(45) Date of Patent: Mar. 18, 2014

(54) METHOD FOR PRODUCING SILICON FINE PARTICLES AND METHOD FOR CONTROLLING PARTICLE DIAMETER OF SILICON FINE PARTICLES

(75) Inventors: Seiichi Sato, Ako-gun (JP); Mari Miyano, Nishitokyo (JP); Shigeki Endo, Tokorozawa (JP); Osamu Shiino, Nishitokyo (JP); Shingo Ono, Higashimurayama (JP); Masato Yoshikawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/821,603

(22) PCT Filed: Sep. 9, 2011

(86) PCT No.: PCT/JP2011/070636
§ 371 (c)(1),
(2), (4) Date: Mar. 8, 2013

(87) PCT Pub. No.: WO2012/033203
PCT Pub. Date: Mar. 15, 2012

(65) Prior Publication Data
US 2013/0168356 A1    Jul. 4, 2013

(30) Foreign Application Priority Data
Sep. 10, 2010  (JP) .................... 2010-203528

(51) Int. Cl.
  *B44C 1/22*    (2006.01)
  *C03C 15/00*   (2006.01)
  *C03C 25/68*   (2006.01)
  *C23F 1/00*    (2006.01)

(52) U.S. Cl.
  USPC .............................. 216/94; 216/99

(58) Field of Classification Search
  CPC .............. B44C 1/227; H01L 21/31111; H01L 21/30604; B82Y 10/00
  USPC ................................ 216/83, 94, 99
  See application file for complete search history.

(56) References Cited

U.S. PATENT DOCUMENTS 5,069,740 A * 12/1991 Levine et al. .................... 117/81
7,658,899 B2   2/2010 Nagata et al.

FOREIGN PATENT DOCUMENTS

| JP | 61-215211 A   | 9/1986 |
| JP | 2006-70089 A  | 3/2006 |
| JP | 2007-112656 A | 5/2007 |
| JP | 2008-19114 A  | 1/2008 |
| JP | 2008-19115 A  | 1/2008 |
| WO | 2007/086225 A1 | 8/2007 |
| WO | 2009/017205 A1 | 2/2009 |

OTHER PUBLICATIONS

International Search Report for PCT/JP2011/070636, dated Nov. 8, 2011.

* cited by examiner

*Primary Examiner* — Roberts Culbert
(74) *Attorney, Agent, or Firm* — Sughrue Mion, PLLC

(57) ABSTRACT

An object and project of the present invention is to provide a method for producing silicon fine particles and a method for controlling a particle diameter of silicon fine particles which enable efficient production of silicon fine particles having a uniform particle diameter. A the characteristics of the present invention is producing silicon fine particles having a smaller particle diameter than silicon particles and controlling a particle diameter of silicon fine particles by immersing the silicon particles into an etching solution and irradiating the silicon particles immersed in the etching solution with light having a larger energy than a band gap energy of the silicon particles.

5 Claims, 5 Drawing Sheets

METHOD FOR PRODUCING SILICON FINE PARTICLES AND METHOD FOR CONTROLLING PARTICLE DIAMETER OF SILICON FINE PARTICLES

CROSS REFERENCE TO RELATED APPLICATIONS

This application is a National Stage of International Application No. PCT/JP2011/070636 filed Sep. 9, 2011, claiming priority based on Japanese Patent Application No. 2010-203528 filed Sep. 10, 2010, the contents of all of which are incorporated herein by reference in their entirety.

TECHNICAL FIELD

The present invention relates to a method for producing silicon fine particles and a method for controlling a particle diameter of silicon fine particles.

BACKGROUND ART

Conventionally, as a simple method for producing silicon fine particles, a method is known by which silicon fine particles are produced from a composite powder including silicon particles coated with silicon oxide (SiOx, x=1 or 2) (see, for example, Patent Document 1). The composite powder is obtained by baking a mixture including a silicon source and a carbon source in an inert atmosphere, followed by rapid cooling of a gas generated by the baking. The composite powder thus obtained is immersed into an etching solution containing hydrogen fluoride and an oxidant to etch silicon oxide and silicon particles. In this way, silicon fine particles are obtained from a composite powder. By adjusting the etching time and the etching concentration, silicon fine particles having a desired particle diameter are obtained.

PRIOR ART DOCUMENT

Patent Document

Patent Document 1: Japanese Patent Application Publication No. 2007-112656

SUMMARY OF THE INVENTION

Silicon particles contained in a composite powder have various particle diameters, and silicon fine particles obtained from the composite powder have a broad particle size distribution. Even if silicon fine particles having a small particle diameter are obtained by etching, the silicon fine particles do not have a narrow particle size distribution. Thus, silicon fine particles having a uniform particle diameter have yet to be obtained efficiently because the silicon fine particles having various particle diameters include those having particle diameters which are out of a desired particle diameter.

Moreover, a particle size distribution is different in every production. For this reason, even if an etching condition under which a large number of fine particles having a desired particle diameter were obtained were found, this is not necessarily an optimal etching condition for the subsequent production. Hence, it has been difficult to perform etching in accordance with silicon particles having the most uniform particle diameter. From this point also, silicon fine particles having a uniform particle diameter have yet to be obtained efficiently.

Accordingly, the present invention has been made in view of such a circumstance. An object of the present invention is to provide a method for producing silicon fine particles and a method for controlling a particle diameter of silicon fine particles which enable efficient production of silicon fine particles having a uniform particle diameter.

The present inventors have earnestly studied in order to achieve the above-described object. As a result, the present invention having the following characteristics has been completed. A characteristic of the present invention is summarized as a method for producing silicon fine particles having a smaller particle diameter than silicon particles, the method comprising: a preparation step of preparing the silicon particles; and an etching step of immersing the silicon particles into an etching solution containing hydrogen fluoride, wherein in the etching step, the silicon particles immersed in the etching solution are irradiated with light having a larger energy than a band gap energy of the silicon particles.

According to the characteristics of the present invention, in the etching step, the silicon particles immersed in the etching solution are irradiated with the light having a larger energy than the band gap energy of the silicon particles. When the silicon particles are irradiated with an energy larger than the band gap energy of the silicon particles, electron-hole pairs are generated inside the silicon particles. The electron-hole pairs activate the silicon particles, which promotes the etching on the silicon particles.

The smaller the particle diameter of the silicon particles, the larger the band gap energy. Accordingly, silicon particles having a larger band gap energy than the irradiation energy do not generate electron-hole pairs, which suppresses promotion of the etching.

Hence, if silicon particles have a large particle diameter, this promotes the etching, and the etching is performed fast. Meanwhile, if silicon particles have a particle diameter of a larger band gap energy than the irradiation energy, the etching is performed slowly. In this manner, silicon fine particles having a more uniform particle diameter than heretofore are obtained. This enables efficient production of silicon fine particles having a uniform particle diameter.

Another characteristic of the present invention is summarized as the etching solution contains hydrogen fluoride.

Another characteristic of the present invention is summarized as the light is monochromatic light.

Another characteristic of the present invention is summarized as the preparation step includes: a baking step of baking a mixture including a silicon source and a carbon source in an inert atmosphere; a rapid cooling step of rapidly cooling a gas generated by baking the mixture to obtain a composite powder coated with silicon oxide; and a dissolving step of immersing the composite powder into a solution for dissolving the silicon oxide to obtain silicon particles.

A characteristic according to a method for producing silicon fine particles of the present invention is summarized as the method comprising the steps of immersing silicon particles into an etching solution; and irradiating the silicon fine particles immersed in the etching solution with light having a larger energy than a band gap energy of the silicon fine particles.

MODES FOR CARRYING OUT THE INVENTION

An example of a method for producing silicon fine particles according to the present invention will be described with reference to the drawings. Specifically, descriptions are given of (1) Schematic Configuration of Production Apparatus 1, (2) Method for Producing Silicon Fine Particles, (3) Method for Controlling Particle Diameter of Silicon Fine Particles, (4) Other embodiments, (5) Comparative Evaluation, and (6) Operations and Effects.

In the following description of the drawings, same or similar reference signs denote same or similar elements and portions. It should be noted that the drawings are schematic and ratios of dimensions and the like are different from actual ones. Therefore, specific dimensions and the like should be determined in consideration of the following description. The drawings also include portions having different dimensional relationships and ratios from each other.

(1) SCHEMATIC CONFIGURATION OF PRODUCTION APPARATUS 1

Figure 1:
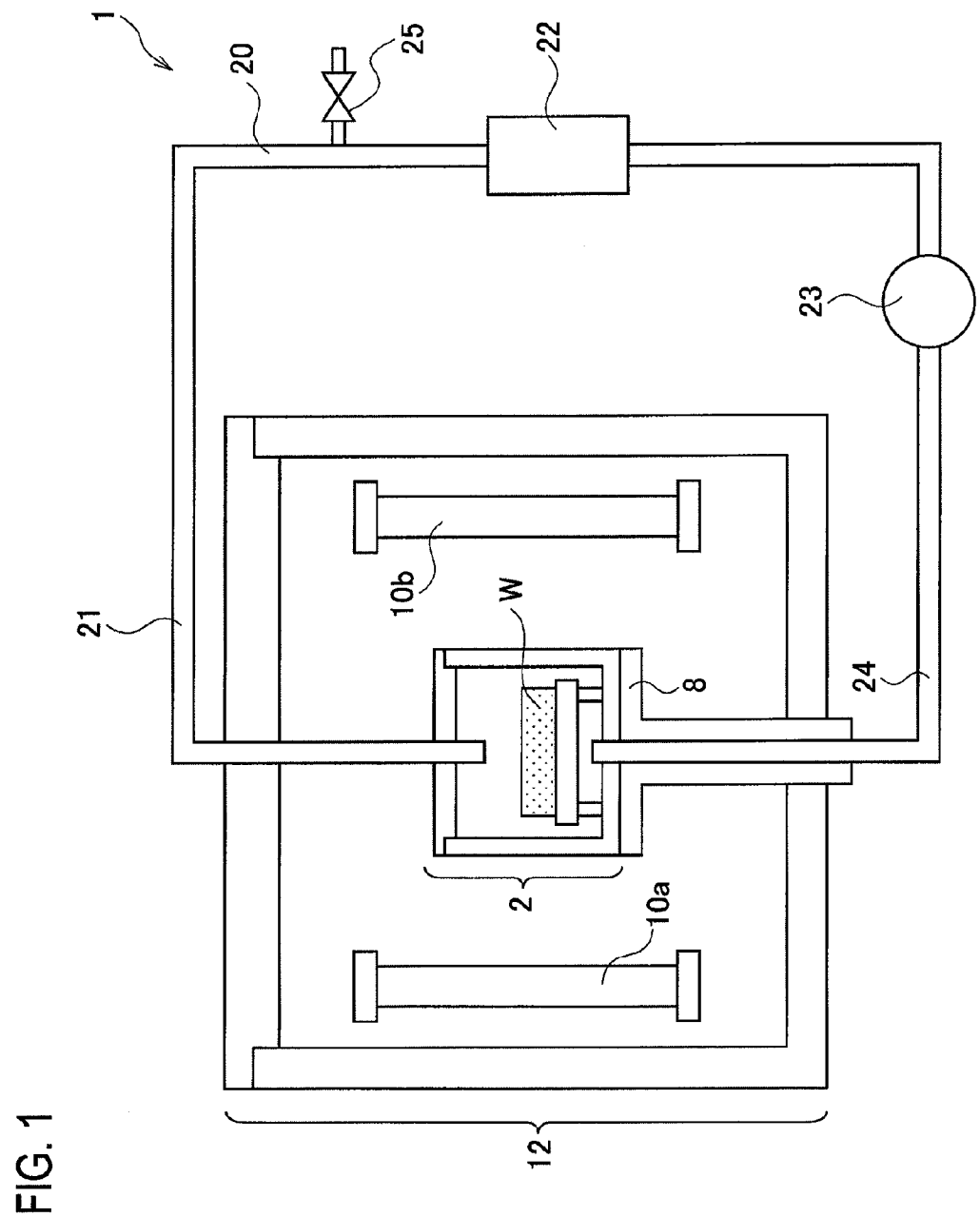
FIG. 1 is a schematic configuration diagram of a production apparatus 1 according to the present embodiment used for producing silicon fine particles.

A schematic configuration of a production apparatus 1 according to the present embodiment used for producing silicon fine particles will be described with reference to FIG. 1. FIG. 1 is a schematic configuration diagram of the production apparatus 1 according to the present embodiment used for producing silicon fine particles.

As shown in FIG. 1, the production apparatus 1 includes a heating enclosure 2, a stage 8, a heater 10a and a heater 10b, an insulator 12, an aspirator 20, a dust collector 22, and a blower 23. The heating enclosure 2 forms a heating atmosphere for a container W housing a mixture including a silicon source and a carbon source. The heater 10a and the heater 10b heat the stage 8 supporting the heating enclosure 2, and the mixture housed in the container W. The insulator 12 covers the heating enclosure 2, the heater 10a, and the heater 10b. The blower 23 sucks a reaction gas from the heating enclosure 2 through a suction pipe 21. The dust collector 22 houses a composite powder. The aspirator 20 has a supply pipe 24 for supplying a gas. The aspirator 20 is capable of sucking a SiO gas while maintaining the heating and inert atmosphere in the heating enclosure 2. The aspirator 20 is provided so that an argon gas can circulate therein. Moreover, the aspirator 20 includes an electromagnetic valve 25 which automatically opens and closes by a pressure set.

(2) METHOD FOR PRODUCING SILICON FINE PARTICLES

Figure 2:
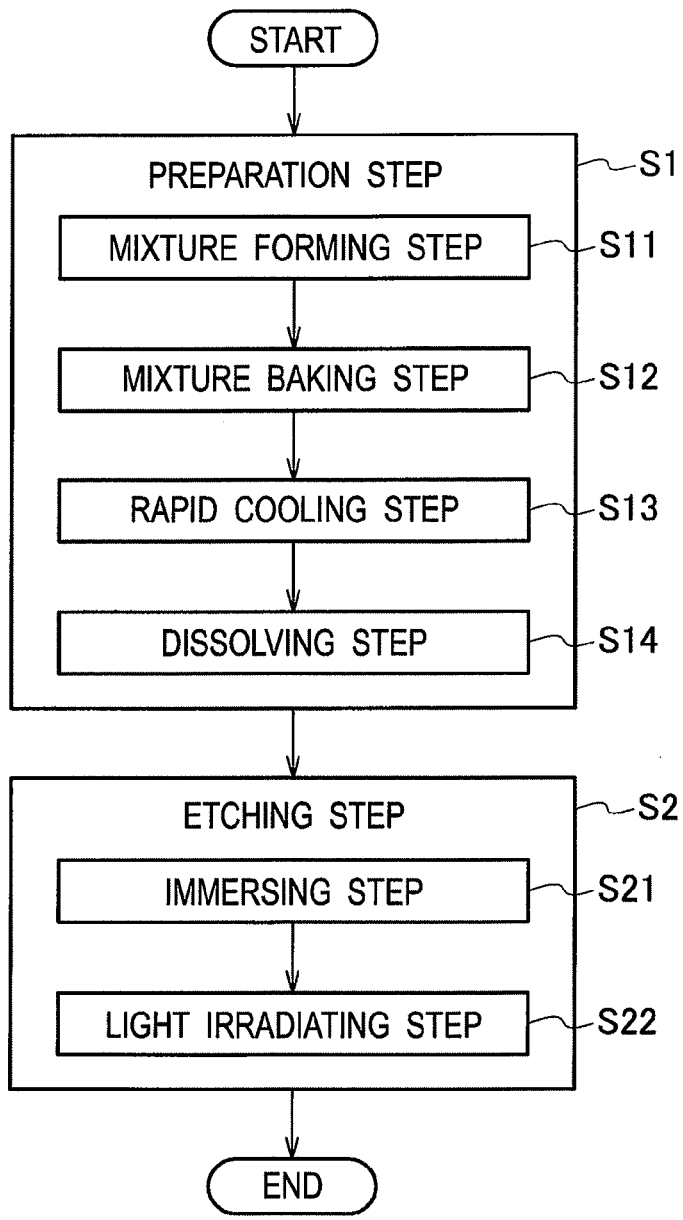
FIG. 2 is a flowchart for explaining a method for producing silicon fine particles according to the present embodiment.

A method for producing silicon fine particles according to the present embodiment will be described with reference to FIGS. 1 and 2. FIG. 2 is a flowchart for explaining the method for producing silicon fine particles according to the present embodiment. As shown in FIG. 2, the method for producing silicon fine particles according to the present embodiment includes steps S1 and S2.

(2.1) Preparation Step S1

Step S1 is a preparation step of preparing silicon particles. Step S1 includes steps S11 to S14.

Step S11 is a step of forming a mixture from a silicon source and a carbon source.

As the silicon source, that is, a silicon-containing raw material, a liquid silicon source and a solid silicon source can be used together. Note that at least one liquid silicon source must be selected as the silicon source.

As the liquid silicon source, polymers of tetraalkoxy silanes and alkoxy silanes (mono-, di-, tri-, tetra-) are used. Among the alkoxy silanes, tetraalkoxy silanes are preferably used. Specific examples thereof include methoxysilane, ethoxysilane, propoxysilane, butoxysilane, and the like. From the view of handling, ethoxysilane is preferable. Examples of the polymers of tetraalkoxy silanes include liquid silicon sources of low molecular weight polymers (oligomers) having a degree of polymerization of approximately 2 to 15 and silicic acid polymers having a higher degree of polymerization.

Examples of the solid silicon source usable together with these liquid silicon sources include silicon oxides. Examples of the silicon oxides include, besides SiO, silica sols (colloidal ultrafine silica-containing solution containing an OH group and an alkoxy group therein), silicon dioxide (silica gel, fine silica, quartz powder), and the like.

Among these silicon sources, tetraethoxysilane oligomers, mixtures of tetraethoxysilane oligomer and fine powder silica, and the like are preferable from the viewpoint of homogeneity and handling.

To obtain a high-purity silicon carbide powder, a high-purity substance is preferable used as the silicon source. Specifically, the initial impurity content is preferably 20 ppm or less, further preferably 5 ppm or less.

Note that examples of the impurity include heavy metal elements such as Fe, Ni, Cu, Cr, V, and W, alkali metal elements such as Li, Na, and K, alkaline earth or amphoteric metal elements such as Be, Mg, Ca, B, Al, and Ga, and the like.

The carbon source, that is, a carbon-containing raw material, is synthesized using a catalyst not containing an impurity element, and may be a monomer, an oligomer, and a polymer composed of any single or two or more organic compounds curable by heating and/or with the catalyst, or through polymerization or cross-linking with a crosslinker.

Preferable specific examples of the carbon-containing raw material include curable resins such as phenolic resins, furan resins, urea resins, epoxy resins, unsaturated polyester resins, polyimide resins, and polyurethane resins synthesized using a catalyst not containing an impurity element. Particularly, resol-type or novolac-type phenolic resins which have a high residual carbon ratio and an excellent workability are preferable.

The resol-type phenolic resins useful in the present embodiment are produced by reacting monovalent or divalent phenols such as phenol, cresol, xylenol, resorcin, or bisphenol A with aldehydes such as formaldehyde, acetaldehyde, or benzaldehyde in the presence of a catalyst not containing an impurity element (specifically, ammonia or an organic amine).

The organic amine used as the catalyst may be any of primary, secondary, and tertiary amines. As the organic amine, it is possible to use dimethylamine, trimethylamine, diethylamine, triethylamine, dimethylmonoethanolamine, monomethyldiethanolamine, N-methylaniline, pyridine, morpholine, and the like.

As the method for synthesizing a resol-type phenolic resin by reacting a phenol with an aldehyde in the presence of ammonia or an organic amine, conventionally known methods can be employed, except that a different catalyst is used.

Specifically, 1 to 3 moles of the aldehyde and 0.02 to 0.2 moles of the organic amine or ammonia are added to 1 mole of the phenol, followed by heating to 60 to 100° C.

Meanwhile, the novolac-type phenolic resins useful in the present embodiment can be produced by mixing monovalent or divalent phenols and aldehydes as described above for reaction using an acid (specifically, hydrochloric acid, sulfuric acid, p-toluenesulfonic acid, oxalic acid, or the like) not containing an impurity element as a catalyst.

For the production of a novolac-type phenolic resin also, conventionally known methods can be employed. Specifically, 0.5 to 0.9 moles of the aldehydes and 0.02 to 0.2 moles of an inorganic acid or organic acid not containing an impurity element are added to one mole of the phenol, followed by heating to 60 to 100° C.

In step S11, to the raw material mixture in which the silicon-containing raw material and the carbon-containing raw material are mixed, a crosslinker or a catalyst for polymerization or cross-linking is added as necessary. The resultant is dissolved in a solvent. A polymerization or cross-linking reaction takes place to form the mixture. The raw material mixture is heated at approximately 150° C. Thereby, the mixture is dried. The Si/C ratio is preferably 0.5 to 3.0.

Step S12 is a step of baking the mixture obtained in step S11 in an inert gas atmosphere. The mixture is housed in the container W. Using the heater 10a and the heater 10b, the mixture is carbonized and silicated by heating and baking in an inert gas atmosphere. Thereby, a gas containing carbon and silicon is generated. Specifically, silicon monoxide (SiO) is produced as shown in the following formula (1).

$$SiO_2 + C \rightarrow SiO + CO \quad (1)$$

The inert gas atmosphere is a non-oxidizing atmosphere. The inert gas includes, for example, vacuum, nitrogen, helium or argon.

Next, step S13 is performed. Step S13 is a step of rapidly cooling the gas generated by baking the mixture to obtain a composite powder including the silicon particles. The blower 23 is actuated. Then, the generated gas is drawn from the inside of the heating enclosure 2 by argon gas stream through the suction pipe 21. Since the outside of the insulator 12 is maintained at room temperature, the generated gas is rapidly cooled to room temperature. Subsequently, a composite powder coated with silicon oxide is obtained from the generated gas. Specifically, by cooling at a temperature below 1600° C., the composite powder including silicon particles is obtained as shown in the following formula (2).

$$2SiO \rightarrow Si + SiO_2 \quad (2)$$

Note that since the reaction in the formula (2) does not always completely proceed, the composite powder includes not only Si and $SiO_2$ but also SiO. In other words, the composite powder includes Si and $SiO_x$ (x=1 or 2), other than impurities.

The obtained composite powder was collected into the dust collector 22. The argon stream is sent into the heating enclosure 2 through the supply pipe 24.

Next, step S14 is performed. Step S14 is a step of immersing the composite powder into a solution for dissolving silicon oxide to obtain silicon particles. The collected composite powder is immersed into a solvent. Examples of the solvent include methanol and ethanol. To the solvent in which the composite powder is immersed, an acid for dissolving silicon oxide is added. Thereby, silicon oxide coating the silicon particles is dissolved, and silicon particles are obtained. An example of the acid includes hydrogen fluoride (HF).

In step S14, not all the silicon oxide coating the silicon particles need to be dissolved. The silicon particle may be partially coated with silicon oxide.

(2.2) Etching Step S2

Next, step S2 is performed. Step S2 is an etching step of immersing the silicon particles into an etching solution. As shown in FIG. 2, step S2 includes steps S21 and S22.

Step S21 is a step of immersing the silicon particles into an etching solution. The silicon particles prepared in step S1 are immersed into an etching solution. The etching solution should be a solution capable of etching silicon fine particles. Examples of the etching solution include a hydrogen fluoride solution and a hot alkaline solution. An example of the alkaline solution includes a potassium hydroxide solution. Since a hydrogen fluoride solution is capable of efficiently etching silicon particles, the etching solution preferably contains hydrogen fluoride. To the etching solution, an oxidant may be added as necessary. Examples of the oxidant include nitric acid ($HNO_3$) and hydrogen peroxide ($H_2O_2$). A slightly polar solvent (for example, 2-propanol) may be mixed with the etching solution to facilitate recovery of silicon fine particles.

Step S22 is a step of irradiating the silicon particles immersed in the etching solution with light having a larger energy than a band gap energy of the silicon particles. The band gap energy of the silicon particles varies, depending on the particle diameter of the silicon particles. Thus, the irradiation light and the etching time need to be adjusted as appropriate in accordance with silicon fine particles to be produced to have a desired particle diameter.

The band gap energy of the silicon particles can be calculated based on the following formula (3).

[Mathematical formula 1]

$$E = E_g + \frac{\hbar^2 \pi^2}{2\mu(2R)^2} \quad \text{formula (3)}$$

E represents a band gap energy of silicon having a particle diameter R. $E_g$ represents a band gap energy of bulk silicon. Specifically, $E_g$ is 1.2 eV.

$\hbar$ represents a value obtained by dividing the Planck constant by $2\pi$. $\mu$ represents a reduced mass. Specifically, $\mu$ is 0.015 $m_e$ where $m_e$ is an electron rest mass.

Based on the formula (3), the band gap energy of the silicon particles obtained according to step S1 is calculated. The silicon particles immersed in the etching solution are irradiated with light having a larger energy than the calculated band gap energy of the silicon particles.

The energy of the irradiation light may be calculated by assigning a desired particle diameter of silicon fine particles to R in the formula (3). The silicon particles are irradiated with the light having the calculated energy. The energy of the irradiation light can be adjusted by the wavelength of light.

The irradiation light is preferably monochromatic light that has only a certain wavelength. This is because it makes it easy to control the particle diameter in comparison with light having multiple wavelengths.

The light irradiation increases the temperature of the etching solution. The increased temperature increases the etching speed. In order to facilitate the controlling of the particle diameter, a particle diameter-controlling effect is preferably obtained only by light irradiation while suppressing the change in etching speed by temperature. Thus, light irradiation is preferably performed while keeping the temperature of the etching solution constant.

When the light is absorbed by a substance present around the silicon particles (for example, the solvent, a gas around the solvent, or the like), this makes it hard for the light to reach the silicon fine particles. For this reason, the energy of the irradiation light is preferably adjusted in consideration of the light absorption properties of the substance present around the silicon particles. For example, in a case where the solvent is water and the gas around the solvent is air, it is preferable to irradiate with light having an energy of 6.5 eV or smaller (wavelength of 190 nm or longer).

The etching is proceeded while the light irradiation is being performed. When the silicon fine particles have a desired particle diameter, the silicon fine particles are extracted from the etching solution. The extracted silicon fine particles are dried as appropriate. In this manner, the silicon fine particles are obtained.

Note that a hydrogen atom added to the surface of the silicon fine particles during the etching may be replaced by an unsaturated hydrocarbon group.

(3) METHOD FOR CONTROLLING PARTICLE DIAMETER OF SILICON FINE PARTICLES

A method for controlling a particle diameter of silicon fine particles according to the present embodiment will be described. Note that the method for controlling a particle diameter of silicon fine particles according to the present embodiment is the same process as etching step S2 in the method for producing silicon fine particles described above.

First, silicon fine particles are prepared whose particle diameter is desired to be controlled. The silicon fine particles described here include not only ones having a particle diameter equivalent to silicon fine particles produced by the above-described production method, but also ones with various particle diameters. Thus, for example, the silicon fine particles include silicon particles in the above-described method for producing silicon fine particles.

Next, the silicon fine particles thus prepared are immersed into an etching solution. As the etching solution, the above-described etching solution can be used.

The silicon fine particles immersed in the etching solution are irradiated with light having a larger energy than a band gap energy of the silicon fine particles. The band gap energy of the silicon fine particles can be calculated based on the formula (3) described above. The light having a larger energy than the calculated band gap energy is used for the irradiation. The energy of the light may be calculated based on the formula (3). Specifically, the energy of the light may be calculated by assigning a desired particle diameter of the silicon fine particles to R in the formula (3). The silicon fine particles are irradiated with light having a wavelength corresponding to the energy thus obtained.

The light irradiation time varies, depending on conditions such as the amount of silicon fine particles and light intensity. Thus, he light irradiation time is preferably adjusted as appropriate, depending on such conductions.

The smaller the particle diameter of the silicon fine particles, the larger the band gap energy. In a case of silicon fine particles having a smaller band gap energy than the energy of the irradiation light (hereinafter abbreviated appropriately as first silicon fine particles), the etching thereon is promoted. Accordingly, the first silicon fine particles having a large particle diameter is etched fast. Meanwhile, in a case of silicon fine particles having a larger band gap energy than the energy of the irradiation light (hereinafter abbreviated appropriately as second silicon fine particles), the light irradiation does not promote the etching. Accordingly, the second silicon fine particles having a small particle diameter is etched slowly in comparison with the first silicon fine particles.

By changing the energy of irradiation light, the particle diameter of the silicon fine particles can be controlled.

(4) OTHER EMBODIMENTS

The present invention has been described by the embodiments above. However, it should not be understood that the description and drawings which constitute part of this disclosure limit the present invention. From this disclosure, various alternative embodiments, examples, and operation techniques will be easily found by those skilled in the art. The present invention includes various embodiment not described herein.

For example, in the method for producing silicon fine particles according to the present embodiment, silicon particles are prepared in step S1. However, the silicon particles are not necessarily limited thereto. The silicon particles may be prepared through purchase of commercially-available silicon particles.

Moreover, the energy of irradiation light does not necessarily have to be calculated based on the formula (3) described above.

Accordingly, the technical scope of the present invention should be determined only by the matters to define the invention in the scope of claims regarded as appropriate based on the description herein.

(5) COMPARATIVE EVALUATION

To examine the effects of the present invention, the following experiments were conducted. Note that these Examples do not limit the present invention at all.

A mixture solution including 620 g of ethyl silicate as the silicon source, 288 g of a phenolic resin as the carbon source, and 92 g (35 wt %) of an aqueous solution of maleic acid as the polymerization catalyst was heated at 150° C. and solidified. Next, the resultant mixture was carbonized in a nitrogen atmosphere at 900° C. for 1 hour. The obtained carbide was heated in an argon atmosphere at 1600° C.

A reaction gas generated during the heating at 1600° C. was transferred to the outside of the heating enclosure 2 using the aspirator 20 and an argon gas as a carrier gas, followed by rapid cooling to obtain a composite powder.

Into 4 ml of methanol, 0.06 g of the obtained composite powder was immersed. To this solution, 5 ml of 46% hydrofluoric acid (HF) was added. The solution was mixed and filtered with a membrane filter. The residue (containing silicon particles) on the membrane filter was dispersed in propanol. To this solution, 0.05 ml of 46% hydrofluoric acid (HF) was added.

While the resulting hydrogen fluoride solution was being stirred with a stirrer, irradiation was performed with monochromatic light. The hydrogen fluoride solution was irradiated with monochromatic light having a wavelength of 365 nm (Example 1), 470 nm (Example 2), or 525 nm (Example 3). The irradiated time was 40 hours.

The resulting hydrogen fluoride solution thus irradiated was filtered with a membrane filter as described above. Thereby, a filtrate containing silicon fine particles was obtained. The filtrate was dried, and the resultant silicon fine particles were observed by TEM.

In addition, before hydrofluoric acid was added, the silicon particles contained in the residue on the membrane filter (Comparative Example 1) were also observed by TEM. In other words, before the etching, the silicon particles were observed by TEM.

Figure 3:
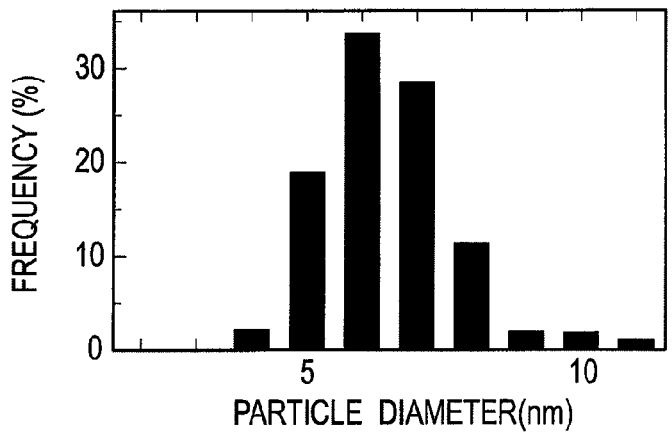
FIG. 3 is a graph showing a particle size distribution in Comparative Example 1.
Figure 4:
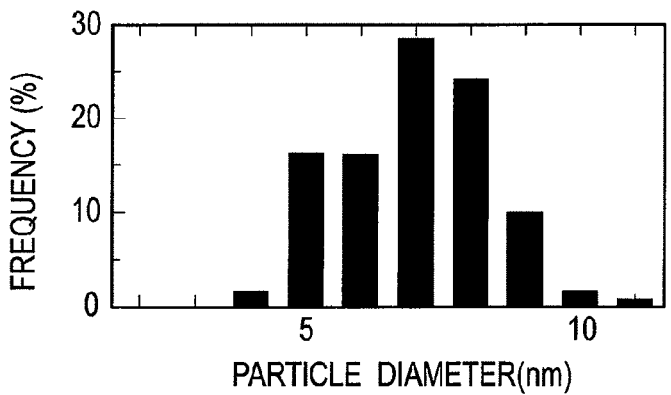
FIG. 4 is a graph showing a particle size distribution in Comparative Example 2.
Figure 5:
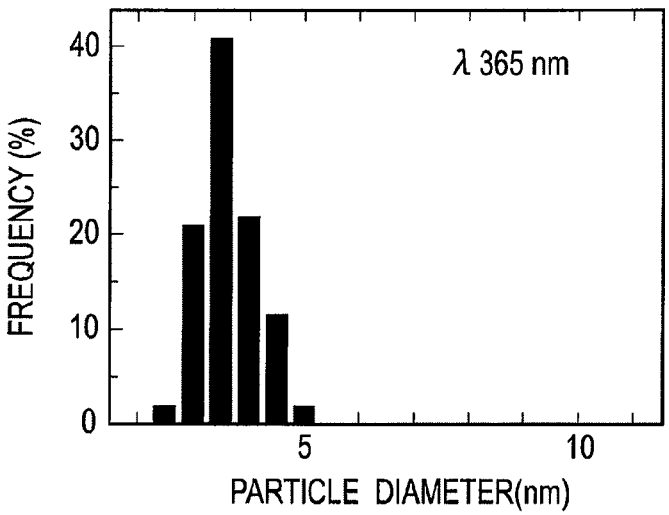
FIG. 5 is a graph showing a particle size distribution in Example 1.
Figure 6:
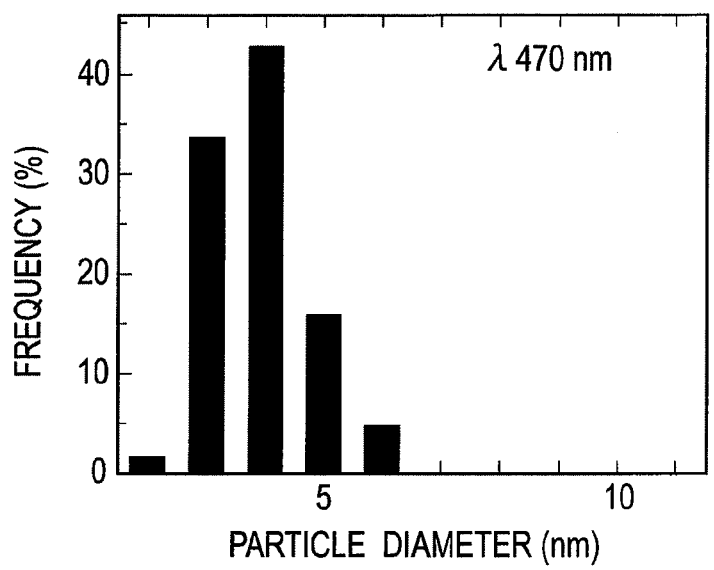
FIG. 6 is a graph showing a particle size distribution in Example 2.
Figure 7:
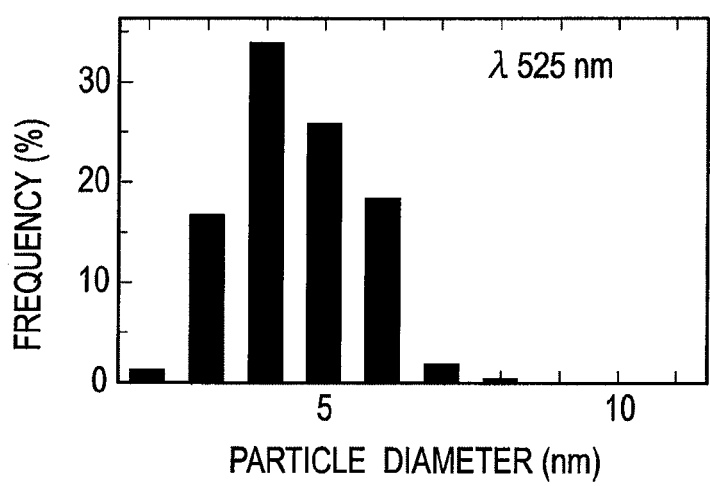
FIG. 7 is a graph showing a particle size distribution in Example 3.

Additionally, silicon fine particles were obtained under the same conditions as those of Examples above except that no irradiation with the monochromatic light was performed (Comparative Example 2). The silicon fine particles were observed by TEM. FIGS. 3 to 7 and Table 1 show the result. FIG. 3 is a graph showing a particle size distribution in Comparative Example 1. FIG. 4 is a graph showing a particle size distribution in Comparative Example 2. FIG. 5 is a graph showing a particle size distribution in Example 1. FIG. 6 is a graph showing a particle size distribution in Example 2. FIG. 7 is a graph showing a particle size distribution in Example 3. The vertical axes in FIGS. 3 to 7 indicate the frequency (%), and the horizontal axes in FIGS. 3 to 7 indicate the particle diameter (nm) of the particles.

TABLE 1

|  | Wavelength (nm) | Average particle diameter (nm) |
|---|---|---|
| Comparative Example 1 | — | 6.25 |
| Comparative Example 2 | — | 6.31 |
| Example 1 | 365 | 3.4 |
| Example 2 | 470 | 3.9 |
| Example 3 | 525 | 4.5 |

As a result of the TEM observations, the ranges of the particle size distribution of the silicon fine particles in Examples 1 to 3 were narrower than those in Comparative Example 1 and 2. Specifically, in Comparative Example 1, the particle diameter of the silicon particles was from 4 nm to 11 nm. In Comparative Example 2, the particle diameter of the silicon fine particles (silicon particles) was from 4 nm to 11 nm. In Example 1, the particle diameter of the silicon fine particles was from 2 nm to 5 nm. In Example 2, the particle diameter of the silicon fine particles was from 2 nm to 6 nm. In Example 3, the particle diameter of the silicon fine particles was from 2 nm to 8 nm. This revealed that etching by light irradiation produces silicon fine particles having a uniform particle diameter in comparison to etching without light irradiation.

Further, it was revealed as shown in Table 1 that irradiation with light of a short wavelength, that is, light having a high energy produces silicon fine particles having a small particle diameter. Thus, it was revealed that by changing the energy of irradiation light, the particle diameter of silicon fine particles can be controlled. Note that it can be seen from Comparative Examples 1 and 2 that the particle diameter hardly changes when light irradiation is not performed. An etching solution capable of etching silicon particles only when the silicon particles are irradiated with light is used preferably in terms of controlling the particle diameter of silicon fine particles.

In addition, the reason why the particle diameter in Comparative Example 2 was slightly larger than that in Comparative Example 1 is presumably that the stirring of the hydrogen fluoride solution with the stirrer caused fusion of some silicon particles (silicon fine particles).

Figure 8:
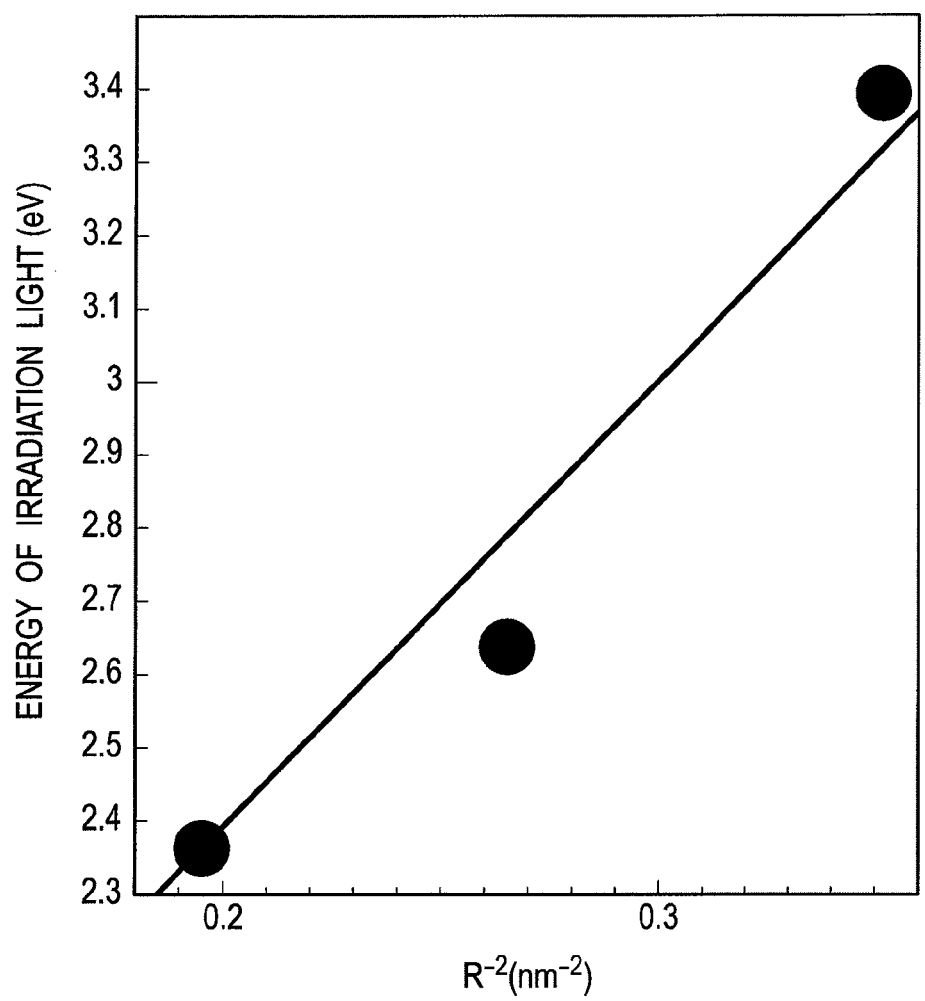
FIG. 8 is a graph showing a relationship between the energy of irradiation light and the particle diameter of silicon fine particles.

FIG. 8 is a graph showing a relationship between the energy of irradiation light and the particle diameter of silicon fine particles. The vertical axis in FIG. 8 indicates the energy of irradiation light, and the horizontal axis in FIG. 8 indicates the reciprocal of the square of an average particle diameter of the obtained silicon fine particles. The straight line shown in FIG. 8 is a straight line obtained based on the formula (3). The black circles plotted in FIG. 8 are data obtained from the above experiments.

It can be seen as shown in FIG. 8 that the plotted point of each data is located on the straight line of the formula (3) or in the vicinity of the straight line of the formula (3). Thus, it was revealed that irradiating silicon particles with light having an energy calculated using the formula (3) produces silicon fine particles having a desired particle diameter. In other words, it was revealed that the particle diameter of silicon fine particles can be controlled.

(6) OPERATIONS AND EFFECTS

The method for producing silicon fine particles according to the present embodiment includes: a preparation step of preparing silicon particles; and an etching step of immersing the silicon particles into an etching solution. In the etching step, the silicon particles immersed in the etching solution are irradiated with light having a larger energy than a band gap energy of the silicon particles.

When silicon particles are irradiated with light having a larger energy than the band gap energy (hereinafter abbreviated appropriately as first silicon particles), electron-hole pairs are generated inside the first silicon particles. In this event, some interatomic bonds inside or on the surface of the first silicon particles are weakened. This promotes a reaction between the first silicon particles and hydrogen fluoride. As a result, the etching on the first silicon particles is promoted. The smaller the particle diameter of silicon particles, the larger the band gap energy of the silicon particles. Accordingly, silicon particles having a larger band gap energy than the energy of the irradiation light (hereinafter abbreviated appropriately as second silicon particles) do not generate electron-hole pairs. Hence, the promotion of the etching on the second silicon particles is suppressed.

Since the etching on silicon particles having a large particle diameter is promoted, the etching on the silicon particles having a large particle diameter is performed fast. When the etching produces silicon particles having a particle diameter of a larger band gap energy than the energy of irradiation light, the etching is not promoted additionally. Thus, silicon particles having a small particle diameter is etched slowly in comparison with silicon particles having a large particle diameter. In other words, such silicon particles are etched under the same condition with no light irradiation. As a result, the resulting silicon fine particles have a narrow particle size distribution. Thus, it is possible to efficiently produce silicon fine particles having a uniform particle diameter.

The higher the energy of irradiation light, the more electron-hole pairs generated inside silicon particles having a larger band gap energy (i.e., silicon particles having a smaller particle diameter). This means that the higher the energy of irradiation light, the longer the promotion of the etching lasts until the particles have a small diameter. Thus, by changing the energy of irradiation light, the particle diameter of the silicon fine particles can be controlled.

In the method for producing silicon fine particles according to the present embodiment, the irradiation light is monochromatic light. This makes it easy to control the particle diameter in comparison with light having multiple wavelengths.

Note that the entire content of Japanese Patent Application No. 2010-203528 (filed on Sep. 10, 2010) is incorporated herein by reference.

INDUSTRIAL APPLICABILITY

The method for producing silicon fine particles according to the present invention enables efficient production of silicon fine particles having a uniform particle diameter. Moreover, the method for controlling a particle diameter of silicon fine particles according to the present invention can control the particle diameter of silicon fine particles.

The invention claimed is:

1. A method for producing silicon fine particles having a smaller particle diameter than silicon particles, the method comprising:
   a preparation step of preparing the silicon particles; and
   an etching step of immersing the silicon particles into an etching solution, wherein
   in the etching step, the silicon particles immersed in the etching solution are irradiated with light having a larger energy than a band gap energy of the silicon particles.

2. The method for producing silicon fine particles according to claim 1, wherein the etching solution contains hydrogen fluoride.

3. The method for producing silicon fine particles according to claim 1, wherein the light is monochromatic light.

4. The method for producing silicon fine particles according to claim 1, wherein
   the preparation step includes:
   a baking step of baking a mixture including a silicon source and a carbon source in an inert atmosphere;
   a rapid cooling step of rapidly cooling a gas generated by baking the mixture to obtain a composite powder coated with silicon oxide; and
   a dissolving step of immersing the composite powder into a solution for dissolving the silicon oxide to obtain silicon particles.

5. A particle diameter-controlling method for controlling a particle diameter of silicon fine particles, the method comprising the steps of:
   immersing silicon fine particles into an etching solution; and
   irradiating the silicon fine particles immersed in the etching solution with light having a larger energy than a band gap energy of the silicon fine particles.

* * * * *